:::
United States Patent Office 2,921,858
Patented Jan. 19, 1960

2,921,858
PROCESS AND COMPOSITION FOR TREATING METAL TO INCREASE CORROSION RESISTANCE

Wilbur S. Hall, Plymouth Meeting, Pa., assignor to Amchem Products, Inc., Ambler, Pa., a corporation of Delaware No Drawing. Application April 30, 1957
Serial No. 655,950

12 Claims. (Cl. 106—14)

This invention relates to the art of passivating or increasing the corrosion resistance of metal surfaces.

It is well known that metals such as steel, aluminum, magnesium and zinc tend to corrode in relatively short periods of time especially in atmospheres containing salt such as found, for example, at the seashore, and in certain industrial areas where the air is liable to be heavily burdened with corrosive gases. In areas of the kind mentioned, corrosion may become very rapid and severe and even in situations where the atmosphere is apparently clear, corrosion often becomes evident in the formation of stains or deposits on the surface of the metal. On zinciferous surfaces, such deposits are known as white rust and in warehouses where zinc is stored or in galvanizing mills. such white rusting may be stimulated by moisture deposited as the result of condensation which often takes place, for example, between the layers of a pile of metal sheets.

With the foregoing in mind the principal object of the invention resides in the provision of an improved method and material for treating metal surfaces whereby to render them corrosion resistant or passive to a very high degree and without substantially altering the texture, color or general appearance of the surface.

A further object of the invention is the provision of a process and materials for passivating metal surfaces by means of which a substantially colorless finish can be applied to the surface in a relatively short period of time, say from 2 to 10 seconds, and without the necessity of heating the solution used in the process or the metal which is to be treated.

Still another object of the invention is the provision of a process and material of the character described which is applicable not only to plain metallic surfaces, such as those mentioned above, but also to metal surfaces which have previously been coated with a chemically produced film such, for example, as chromate, oxalate or phosphate conversion coatings.

How the foregoing objects and advantages are attained will now be described.

My invention is based upon the discovery that if a metal surface is subjected to the action of an aqueous solution containing a volatile alkali, resin and hexavalent chromium in certain proportions as will further appear, it is possible to greatly improve the corrosion resistance thereof or to passivate the surface without substantially altering its physical appearance in a treating time which may be as short as from 2 to 10 seconds and also without the necessity of heating the solution.

In this disclosure the term "resin" will be used in its conventional technical meaning, i.e., as referring to a semi-solid or soild, complex, amorphous mixture of substantially water-insoluble organic compounds of high molecular weight with no definite melting point and the resins which are useful with my invention are those which contain a sufficient number of carboxylic or other acid groups in their molecular configuration to permit of their being dissolved in an aqueous solution having a pH which is 7 or higher and which contains at least 2 grams per liter of water-soluble hexavalent chromium expressed as $CrO_3$. Resins that simply form dispersions or emulsions such as nylon latices are not useful in the present invention. Typical examples of resin classes which are particularly useful for the purposes of this invention are: shellac, vinyl acetate-crotonic acid copolymers, vinyl acetate-maleic anhydride copolymers, vinyl acetate-phthalic anhydride copolymers, vinyl acetate-acrylic acid copolymers, vinyl acetate-methacrylic acid copolymers and styrene-crotonic acid copolymers.

By the term "hexavalent chromium" as used herein I refer to some water soluble source of hexavalent chromium such as chromic acid ($CrO_3$) or sodium, potassium, ammonium and morpholine chromate or dichromate. However, the source is not so important as long as it is water soluble and preferably contains no nonvolatile cation inasmuch as the presence of such non-volatile cations in the coating bath will significantly impair the corrosion resistance or passivity afforded by the process of the invention.

Insofar as the pH of the solution is concerned it must, as stated, be at least 7 and for best results, is usually below 9.2 and this pH must be achieved and maintained by means of volatile alkali. Volatile alkali in excess of this requirement will do no particular harm just so long as the resin is soluble in at least the minimum concentration of resin given below.

The concentration of resin is important and it should be at least 3% (weight/volume, i.e., grams per 100 ml.) of the bath. On the upper side of the limit of concentration of resin in the coating bath may be as much as 15% or higher and is governed essentially by the ability of the equipment or apparatus used in the treating procedure to thoroughly wet the metal with the solution. I have found that in a dip or spray process the optimum concentration of resin is between 4 and 7%.

Insofar as the water soluble hexavalent chromium content is concerned, I have found that, per liter of treating solution, there must be at least 2 grams and preferably from 3 to 5 grams of hexavalent chromium calculated as $CrO_3$. The maximum quantity may vary but is always to be limited by that amount which will not cause the resin to precipitate. At concentrations of less than 3 grams per liter, the effectiveness of the treating solution falls off markedly and at concentrations of less than 2 grams per liter, the solutions are of very little value for the purposes of the present invention.

Useful examples of passivating solutions which fall under the purview of my invention are as follows:

Formula No. 1

|   | Grams |
|---|---|
| Ammonium dichromate | 0.5 |
| Lemac 541–10[1] | 5.0 |
| 28% aqua ammonia | .25 |
| Water | 94.25 |

Formula No. 2

| Sodium dichromate | 0.5 |
|---|---|
| Lustrex 810[2] | 5.0 |
| 28% aqua ammonia | 0.5 |
| Water | 94 |

Formula No. 3

| Ammonium dichromate | 0.5 |
|---|---|
| Shellac (bleached) | 5.0 |
| 28% aqua ammonia | 0.5 |
| Water | 94 |

Formula No. 4

| | |
|---|---|
| Ammonium dichromate | 0.5 |
| Polyvinyl hydrogen phthalate (procured from Distillation Products Inc.) | 5.0 |
| 28% aqua ammonia | 5.0 |
| Water | 89.5 |

Formula No. 5

| | |
|---|---|
| Ammonium dichromate | 0.5 |
| Vinyl acetate-crotonic acid copolymer | 14.6 |
| 28% aqua ammonia | .73 |
| Water | 84.17 |

Formula No. 6

| | |
|---|---|
| Ammonium dichromate | 0.3 |
| Vinyl acetate-crotonic acid copolymer | 3.0 |
| 28% aqua ammonia | 0.1 |
| Water | 96.6 |

Formula No. 7

| | |
|---|---|
| Ammonium dichromate | 0.5 |
| Vinyl acetate-crotonic copolymer | 5.0 |
| Morpholine | 0.25 |
| Water | 94.25 |

[1] Trademark of the Borden Chemical Company for its polyvinyl acetate-crotonate.
[2] Trademark of the Monsanto Chemical Company for its styrene crotonic acid copolymer.

In using the solutions of my invention for the treatment of zinc or galvanized metal, it is not necessary to heat the passivating bath because it functions admirably at low or average room temperatures. Indeed, if any heat is employed, the temperature of the treating bath should not be high enough to drive off the voltatile alkali because if the volatile alkali is driven off, the bath will coagulate and be rendered ineffective.

The surface of the metal to be treated should be reasonably clean, but since the cleaning forms no part of the present invention it will not be set forth in detail because any cleaning procdure which is familiar to the art may be adopted for the present invention.

In situations where the present invention is used in conjunction with a continuous galvanizing line, after the galvanizing procedure, the metal is usually simply run through either a spray set-up or a dip tank or subjected to the solution by any other suitable means for applying the solution to the surface just so long as the metal is exposed to the action of the solution for from at least 2 to 10 seconds. Following the treatment as just described, the adhering treating solution may be removed from the surface by means of squeegee rolls, after which the treated surface is simply dried.

By following the procedures and using the solutions described a substantially invisible coating or covering weighing in the range of from 5 to 35 milligrams per square foot may be applied to the surface of the treated metal. The coating is not a chemically bonded coating but rather a physically applied resinous film or covering which is deposited when the volatile alkali is driven off by the final drying step. Experience has shown that for galvanized surfaces, coatings of the magnitude just mentioned provide exceptionally good corrosion resistance without altering the surface appearance. For that reason the process of applying a coating which weighs between 5 and 35 milligrams per square foot is one of the objectives of the present invention.

Other metals such as steel, magnesium and aluminum may be similarly treated and, as already indicated, the materials and the process of the present invention are also useful in treating metal surfaces which already carry a chemically produced conversion coating such as a phosphate coating. In the event that the present invention is employed after a phosphatizing treatment my solutions and process are normally used in lieu of the customary dilute acid final rinse because it has been found that, by replacing such dilute acidulated rinse with the materials of the present invention, it is possible to vastly increase the resistance of the surface to corrosion as measured by standard ASTM salt-fog cabinet tests in comparison with the resistance afforded by phosphate coatings which have been rinsed only with the familiar dilute chromic-acid rinses. By way of example, in one test, steel panels treated with a preparatory phosphatizing material, which panels were subsequently rinsed with the familiar dilute-chromic acid rinsing solutions, at the end of 16 hours' exposure in a standard ASTM salt-fog cabinet, showed extensive general rust spots; whereas, when a material according to the present invention was substituted for the old acidulated rinse, the phosphatized surfaces had no corrosion at all after the 16-hour exposure.

Quite often it is desirable to formulate the chemical constituents used in preparing the solution in the form of a concentrate which can be added to water to prepare the necessary bath. This insures the presence of the needed constituents in their proper proportions. To this end, I have found that, in general, said solid concentrates may be formulated which consist essentially of from 0.3 to 0.5 part of water soluble hexavalent chromium from the class which consists of ammonium chromate and dichromate, morpholine chromate and dichromate expressed as chromic acid and from 4 to 7 parts of resin from the class which consists of those resins which contain a sufficient number of acid groups in their molecular configuration to insure solution in the composition specified. Materials of this kind when diluted with water will produce a bath which falls within the preferred ranges as described above.

I claim:
1. The method of treating metal surfaces to increase the corrosion resistance thereof which comprises subjecting the surface to the action of a solution consisting essentially of water, a volatile alkali, resin and water-soluble hexavalent chromium; the quantity of volatile alkali present being sufficient to yield a pH of at least 7; the quantity of resin being at least 3% (weight/volume, i.e., grams por 100 ml.) of the solution; the hexavalent chromium being chosen from the group which consists of chromic acid, and sodium, potassium, ammonium and morpholine chromate and dichromate and the concentration of hexavalent chromium (calculated as $CrO_3$) being at least 2 grams per liter but insufficient to precipitate the resin; the resin being chosen from the class which consists of those resins which contain a sufficient number of acid groups in their molecular configuration to permit their being dissolved in the solution; and drying the treated surface.

2. The method of claim 1 wherein the surface of the metal is subjected to the action of the solution for at least 2 to 10 seconds.

3. The method of claim 1 wherein the pH lies between 7 and 9.2.

4. The method of claim 1 wherein the concentration of the resin is between 4 and 7%.

5. The method of claim 1 wherein the concentration of hexavalent chromium is between 3 and 5 grams/liter.

6. The method of treating zinciferous surfaces according to claim 1 wherein the treatment is sufficient to form a coating on the surface which weighs from 5 to 35 milligrams per square foot.

7. A metal coating bath consisting essentially of water, a volatile alkali, resin and water-soluble hexavalent chromium wherein the quantity of volatile alkali present is sufficient to yield a pH of at least 7, the quantity of resin is at least 3% (weight/volume, i.e., grams per 100 ml.) of the solution, and the concentration of hexavalent chromium (calculated as $CrO_3$) is at least 2 grams per liter but insufficient to precipitate the resin; the resin being chosen from the class which consists of shellac, vinyl acetate-crotonic acid copolymers, vinyl acetate-maleic anhydride copolymers, vinyl acetate-phthalic anhydride copolymers, vinyl acetate-acreylic acid copolymers, vinyl acetate-methacrylic acid copolymers and styrene-crotonic acid copolymers, and the hexavalent chromium being chosen from the group which consists of chromic acid and sodium, potassium, ammonium and morpholine chromate and dichromate.

8. A bath according to claim 7 wherein the pH lies between 7 and 9.2.

9. A bath according to claim 7 wherein the concentration of resin is between 4 and 7%.

10. A bath according to claim 7 wherein the concentration of hexavalent chromium is between 3 and 5 grams/liter.

11. A bath according to claim 7 wherein the concentration of resin is between 4 and 7% and that of hexavalent chromium is between 3 and 5 grams/liter.

12. A concentrate for use in preparing an aqueous bath according to claim 7, said concentrate consisting essentially of from 0.3 to 0.5 part of water soluble hexavalent chromium from the class which consists of ammonium chromate and dichromate and morpholine chromate and dichromate expressed as chromic acid; and from 4 to 7 parts of resin from the class described.

References Cited in the file of this patent

UNITED STATES PATENTS

| | | |
|---|---|---|
| 2,412,543 | Tanner | Dec. 10, 1946 |
| 2,425,023 | Bassford | Aug. 5, 1947 |
| 2,731,354 | Wirshing | Jan. 17, 1956 |
| 2,816,051 | Harford | Dec. 10, 1957 |

OTHER REFERENCES

Chatfield: Varnish Constituents, Interscience Publishers, Inc., N.Y., 1944, pages 97–98.